(No Model.)

J. MURRAY.
COMBINED SQUARE, MITER, AND TRY SQUARE.

No. 386,487. Patented July 24, 1888.

WITNESSES:
Th. Rolle.
Jas. F. Kelly.

INVENTOR:
John Murray.
BY Wiederoheim & Kritner
ATTORNEYS.

UNITED STATES PATENT OFFICE.

JOHN MURRAY, OF CONSHOHOCKEN, PENNSYLVANIA.

COMBINED SQUARE, MITER, AND TRY-SQUARE.

SPECIFICATION forming part of Letters Patent No. 386,487, dated July 24, 1888.

Application filed August 2, 1887. Serial No. 245,919. (No model.)

*To all whom it may concern:*

Be it known that I, JOHN MURRAY, a citizen of the United States, residing at Conshohocken, in the county of Montgomery, State of Pennsylvania, have invented a new and useful Improvement in a Combined Square, Miter-Square, and Try-Square, which improvement is fully set forth in the following specification and accompanying drawings.

My invention relates to improvements in carpenters' tools; and to this end it consists in a novel combined square, miter, and try-square, so devised that it serves all three functions in a single tool. It will be best understood by referring to the accompanying drawings, in which—

Figure 1:
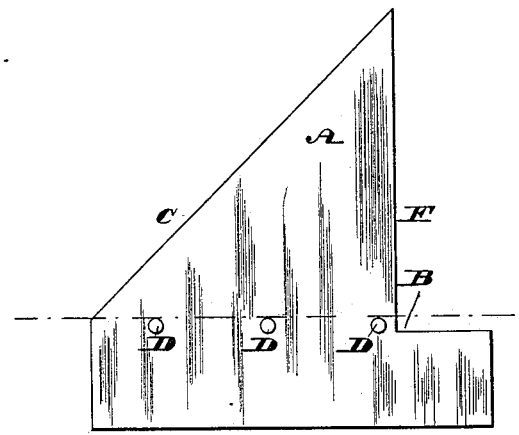
Figure 2:
Figure 3:
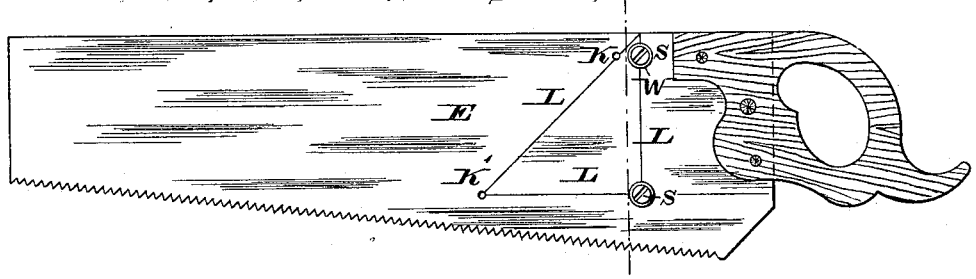

Figure 1 is a plan view of my improved implement, and Fig. 2 an edge view. Fig. 3 shows its application as a square and miter to a common handsaw, and Fig. 4 is an edge view of Fig. 3.

A is an implement having an incline, C, and a projecting portion, B, having its upper edge at a right angle to the side F, whereby the implement is adapted to serve as a try-square.

D D D are screws set in line in the body of the implement and at right angles to the side F, projecting from both sides, as shown in Fig. 2. They may be set at any depth and used for alignment from either side. By means of the projection B and side F the implement may be used in place of the ordinary try-square.

Figure 4:
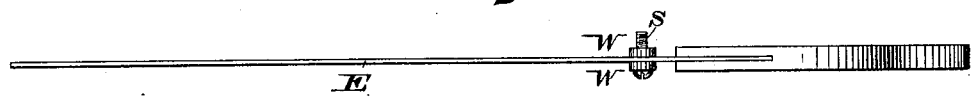

In Fig. 3 the square is formed by the back of the saw-blade E, and the screws S S, with their nuts W W, as seen in Fig. 4.

K K' are two holes through the blade on a line at an angle of forty-five degrees from the back of the saw. L L are diagrammatic lines showing the angles of the miter and the square and do not appear on the implement itself.

The operation of the device shown in Figs. 1 and 2 is obvious to those skilled in the art.

To use the construction shown in Figs. 3 and 4, I lay the saw flat on the lumber and hold the nuts or washers W W againsts its side, marking with the usual carpenter's pencil and scribe the square line along the back of the saw. I then make marks through the holes K K' with the point of the scribe, after which a line is drawn from mark to mark, using the back of the saw as a rule.

Having thus described my invention, what I claim as new, and desire to secure by Letters Patent, is—

1. A combined miter, square, and try-square consisting of a piece of material having an inclined edge, C, the right-lined side F, and the projection B, with upper edge at right angles to the line F, and screws D, set in openings in said piece at right angles to said side F, substantially as described.

2. The implement A, with inclined side C, the side F, and screws D, the line of said screws and the side F being at a right angle to each other, substantially as and for the purpose set forth.

3. The implement A, with inclined side C, the right-lined side F, and having openings therein at right angles to the side F, with screws in said openings, substantially as and for the purpose set forth.

JOHN MURRAY.

Witnesses:
JAS. F. KELLY,
CHAS. J. KINTNER.